US011212815B2

(12) United States Patent
Wang et al.

(10) Patent No.: US 11,212,815 B2
(45) Date of Patent: Dec. 28, 2021

(54) WIRELESS COMMUNICATION METHOD, APPARATUS AND SYSTEM

(71) Applicant: Panasonic Intellectual Property Corporation of America, Torrance, CA (US)

(72) Inventors: Lilei Wang, Beijing (CN); Hidetoshi Suzuki, Kanagawa (JP); Ayako Horiuchi, Kanagawa (JP); Tetsuya Yamamoto, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 445 days.

(21) Appl. No.: 16/321,665

(22) PCT Filed: Aug. 10, 2016

(86) PCT No.: PCT/CN2016/094375
§ 371 (c)(1),
(2) Date: Jan. 29, 2019

(87) PCT Pub. No.: WO2018/027670
PCT Pub. Date: Feb. 15, 2018

(65) Prior Publication Data
US 2021/0282157 A1 Sep. 9, 2021

(51) Int. Cl.
*H04W 72/10* (2009.01)
*H04L 5/14* (2006.01)
(52) U.S. Cl.
CPC ........... *H04W 72/10* (2013.01); *H04L 5/1469* (2013.01)

(58) Field of Classification Search
CPC ..... H04L 5/1469; H04L 1/1861; H04W 72/10
See application file for complete search history.

(56) References Cited

U.S. PATENT DOCUMENTS

2016/0095105 A1\* 3/2016 Chen .................... H04L 1/1861
370/329

FOREIGN PATENT DOCUMENTS

| CN | 101296414 A | 10/2008 | |
|---|---|---|---|
| WO | 2015/084226 A1 | 6/2015 | |
| WO | 2015/094914 A1 | 6/2015 | |
| WO | WO2015/094914 | \* 6/2015 | ............... H04L 5/14 |

(Continued)

OTHER PUBLICATIONS

International Search Report of PCT application No. PCT/CN2016/094375 dated May 2, 2017.

(Continued)

*Primary Examiner* — Myron Wyche
(74) *Attorney, Agent, or Firm* — Seed IP Law Group LLP

(57) ABSTRACT

There are provided a wireless communication method, apparatus and system. The apparatus, at a first node configured to receive a first channel and/or transmit a second channel, comprising: a receiver, which in operation, receives a first channel; a transmitter, which in operation, transmits a second channel; a circuitry, which, in operation, determines at least part of at least one of the first channel and the second channel to be shortened, according to characteristic of the at least one of the first channel and the second channel, and, in response to said determining, shortens the at least part of the at least one of the first channel and the second channel.

19 Claims, 10 Drawing Sheets

(56) References Cited

FOREIGN PATENT DOCUMENTS

WO    WO2015/084226    * 11/2015    ........... H04B 7/2615

OTHER PUBLICATIONS

3GPP TS 36.211 V13.2.0, "3rd Generation Partnership Project; Technical Specification Group Radio Access Network; Evolved Universal Terrestrial Radio Access (E-UTRA); Physical channels and modulation (Release 13)", Jun. 2016.

* cited by examiner

WIRELESS COMMUNICATION METHOD, APPARATUS AND SYSTEM

BACKGROUND OF THE DISCLOSURE

Field

The present technology relates to wireless communication field, and more particular, to a wireless communication method, apparatus and system.

Description of Related Art

In a wireless communication field, end-user radio or wireless terminals, also known as user equipment units (UEs), communicate via a wireless network such as a radio access network (RAN) with a radio base station (RBS), also called "eNodeBs" (eNBs). The radio access network (RAN) covers a geographical area which is divided into cell areas, with each cell area being served by a radio base station.

The Universal Mobile Telecommunications System (UMTS) is a third generation mobile communication system, which evolved from the Global System for Mobile Communications (GSM). UMTS Terrestrial Radio Access Network (UTRAN) is a radio access network that uses wideband code-division multiple-access (W-CDMA) for communications between the UEs and the base stations.

The 3rd Generation Partnership Project (3GPP) has undertaken to evolve further the UTRAN and GSM based radio access network technologies. Long Term Evolution (LTE) is a variant of a 3GPP radio access technology. In general, in LTE systems, the functions of a radio network controller (RNC) node are distributed between the radio base stations nodes, referred to in the specifications for LTE as eNodeBs or eNBs, and AGWs.

Transmission and reception from a node, e.g., a radio terminal like a UE and from another node, e.g., a base station like an eNB in a cellular system such as LTE, can be multiplexed in the frequency domain or in the time domain, or combinations thereof. In Frequency-Division Duplex (FDD) systems, downlink (DL) transmission (from eNodeB to UE) and uplink (UL) transmission (from UE to eNodeB) take place in different, sufficiently separated, frequency bands. In the case of FDD operation, there are two carrier frequencies, one for uplink transmission (UL) and one for downlink transmission (DL). For FDD, 10 subframes are available for downlink transmission and 10 subframes are available for uplink transmissions in each 10 ms interval. Uplink and downlink transmissions are separated in the frequency domain. FDD can be either full duplex or half duplex. In the full duplex FDD operation, a UE can transmit and receive simultaneously, while in the half-duplex FDD operation, the UE cannot transmit and receive at the same time while there are no such restrictions in full-duplex FDD. In Time Division Duplex (TDD), downlink and uplink transmission take place in different, non-overlapping time slots.

Typically, a transmitted signal in a communication system is organized in some form of frame structure. For example, LTE TDD uses ten equally-sized subframes 0-9 of length 1 millisecond per radio frame, as illustrated in FIG. 1. Each radio frame of length $T_f=307200 \cdot T_s=10$ ms consists of two half-frames of length $153600 \cdot T_s=5$ ms each. Each half-frame consists of five subframes of length $30720 \cdot T_s=1$ ms. Each subframe i is defined as two slots, 2i and 2i+1, of length $T_{slot}=15360 \cdot T_s=0.5$ ms each. Subframe i in frame $n_f$ has an absolute subframe number $n_{sf}^{abs}=10n_f+i$ where $n_f$ is the system frame number. The uplink-downlink configuration in a cell may vary between frames and controls in which subframes uplink or downlink transmissions may take place in the current frame.

As shown in FIG. 1, a TDD special subframe is split into three parts: a downlink part (DwPTS), a guard period (GP), and an uplink part (UpPTS). The remaining subframes are either allocated to uplink or downlink transmission. The total length of DwPTS, GP and UpPTS is equal to $30720 \cdot T_s=1$ ms. Subframes 0 and 5 and DwPTS are always reserved for downlink transmission. UpPTS and the subframe immediately following the special subframe are always reserved for uplink transmission.

A guard period (GP) is defined in the TDD special frame structure as shown in FIG. 1 for DL-UL switching, and it is common for all the UEs in a same cell. The main purpose of the guard period is to avoid collision between the DL reception and the UL transmission at the UE side. Otherwise if there is no guard period, there would be some collision between the DL reception and the UL transmission at the UE side as shown in FIG. 2.

Currently many issues like frame structure, duplex and so on which are related with new radio access technology (NR) are still under discussion. To support dynamic TDD or flexible duplex is a desirable feature based on majority view. If so, guard period is one necessary function to be supported.

In the current specification, as mentioned above, there are already some definitions on guard period, for example, In TDD, there are some configurations on the special subframe (as shown in the following Table 1) which has different length of the GP. The GP of each configuration is common for all the UEs in the same cell. An uplink channel in the special subframe is not used for data (PUSCH) transmission. So in this case, the downlink channel is always handled (rate matched).

TABLE 1

Configuration of special subframe (lengths of DwPTS/GP/UpPTS) in TS 36.211

| | | Normal cyclic prefix in downlink | | | Extended cyclic prefix in downlink | | |
|---|---|---|---|---|---|---|---|
| | | | UpPTS | | | UpPTS | |
| | | Normal | | | | Normal | Extended |
| Special subframe configuration | DwPTS | cyclic prefix in uplink | Extended cyclic prefix in uplink | | DwPTS | cyclic prefix in uplink | cyclic prefix in uplink |
| 0 | $6592 \cdot T_s$ | $2192 \cdot T_s$ | $2560 \cdot T_s$ | | $7680 \cdot T_s$ | $2191 \cdot T_s$ | $2560 \cdot T_s$ |
| 1 | $19760 \cdot T_s$ | | | | $20480 \cdot T_s$ | | |

TABLE 1-continued

Configuration of special subframe (lengths of DwPTS/GP/UpPTS) in TS 36.211

| | Normal cyclic prefix in downlink | | | Extended cyclic prefix in downlink | | |
|---|---|---|---|---|---|---|
| | | UpPTS | | | UpPTS | |
| | | Normal | | | | |
| Special subframe configuration | DwPTS | cyclic prefix in uplink | Extended cyclic prefix in uplink | DwPTS | Normal cyclic prefix in uplink | Extended cyclic prefix in uplink |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In section 6.2.5 in 3GPP TS 36.211, the guard period is also defined for the half duplex FDD, "For type A half-duplex FDD operation, a guard period is created by the UE by
not receiving the last part of a downlink subframe immediately preceding an uplink subframe from the same UE."

In the above two cases, the downlink channel is always handled (punctured/rate matched) to facilitate the guard period for DL-UL switching.

Accordingly, improved techniques for switching between downlink and uplink in a wireless communication system, while maintaining minimal interference or no collision between downlink and uplink transmissions, are required.

DISCLOSURE SUMMARY

One non-limiting and exemplary embodiment provides improved techniques for switching between downlink and uplink in a wireless communication system.

In one general aspect, there is provided a wireless communication method, at a first node configured to receive a first channel and/or transmit a second channel, the method comprising steps of: determining at least part of at least one of the first channel and the second channel to be shortened, according to characteristic of the at least one of the first channel and the second channel; and in response to said determining, shortening the at least part of the at least one of the first channel and the second channel.

In another general aspect, there is provided an apparatus, at a first node configured to receive a first channel and/or transmit a second channel, comprising: a determination unit configured to determine at least part of at least one of the first channel and the second channel to be shortened, according to characteristic of the at least one of the first channel and the second channel; and a shortening unit configured to, in response to said determining, shorten the at least part of the at least one of the first channel and the second channel.

In another general aspect, there is provided a system, at a first node configured to receive a first channel and/or transmit a second channel, comprising: a processor; a memory storing computer executable instructions, when run by the processor, to perform steps of: determining at least part of at least one of the first channel and the second channel to be shortened, according to characteristic of the at least one of the first channel and the second channel; and in response to said determining, shortening the at least part of the at least one of the first channel and the second channel.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments will now be described with reference to FIGS. 3 through 6, which relate to a communication method, apparatus and system. It is understood that the present technology may be embodied in many different forms and in many different orders and should not be construed as being limited to the embodiments set forth herein. Rather, these embodiments are provided so that this disclosure will be thorough and complete and will fully convey the present technology to those skilled in the art. Indeed, the present technology is intended to cover alternatives, modifications and equivalents of these embodiments, which are included within the scope and spirit of the technology as defined by the appended claims. Furthermore, in the following detailed description of the present technology, numerous specific details are set forth in order to provide a thorough understanding of the present technology. However, it will be clear to those of ordinary skill in the art that the present technology may be practiced without such specific details.

While orders of the steps of the methods and the structures of the components are provided herein for exemplary purposes, but not for limitation. The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

Figure 1:
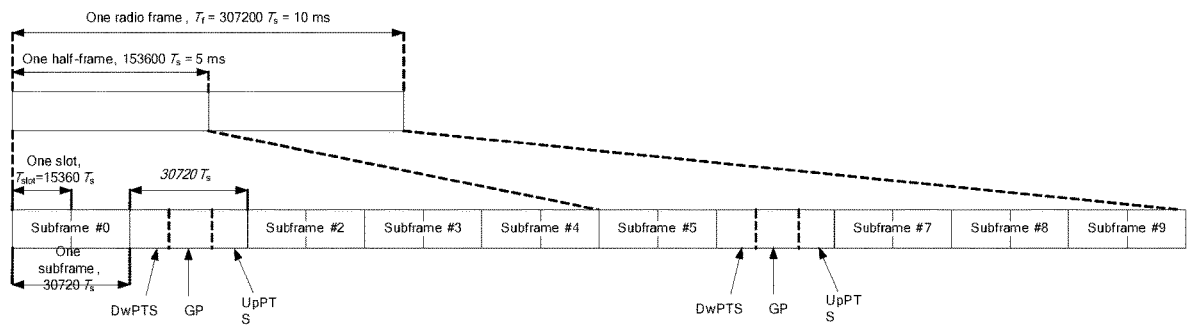
FIG. 1 shows an exemplified frame structure type in TDD system.
Figure 2:
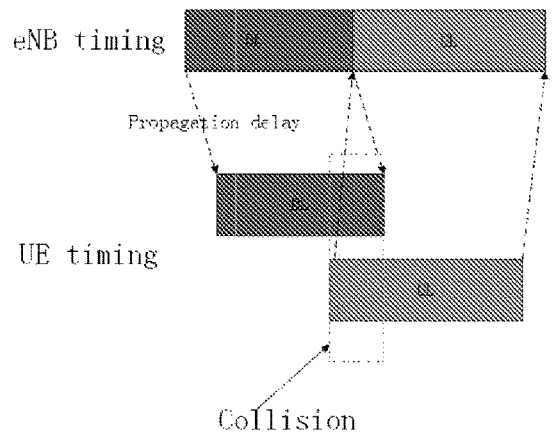
FIG. 2 shows an example of collision in DL reception and UL transmission.
Figure 3:
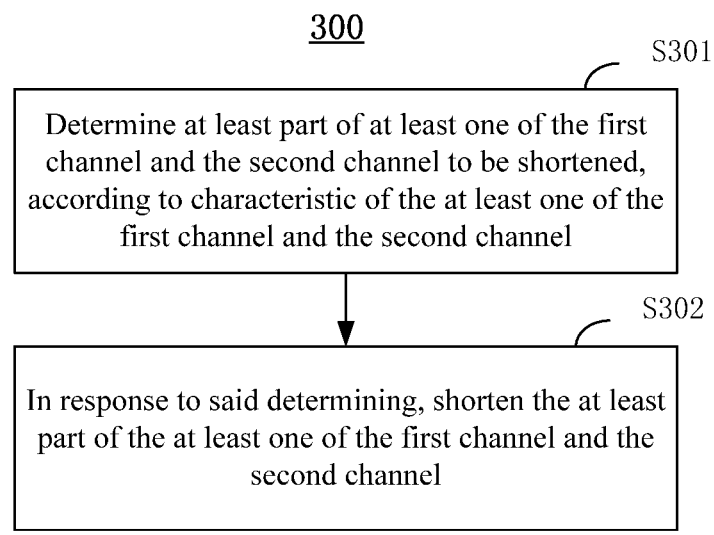
FIG. 3 shows a flowchart of a wireless communication method according to an embodiment of the present disclosure.

FIG. 3 shows a flowchart of a wireless communication method 300 according to an embodiment of the present disclosure.

As shown in FIG. 3, the wireless communication method 300, at a first node configured to receive a first channel and/or transmit a second channel, the method comprising: step S301, determining at least part of at least one of the first channel and the second channel to be shortened, according to characteristic of the at least one of the first channel and the second channel; and step S302, in response to said determining, shortening the at least part of the at least one of the first channel and the second channel.

Thus, according to the present embodiment, it is possible to dynamically determine at least part of at least one of the first channel and the second channel to be shortened, according to characteristic of the at least one of the first channel and the second channel, without fixedly shortening a fixed part of a fixed channel, thereby avoiding interference or collision between the first channel and the second channel.

To be noted that the expression of "at least part of at least one of the first channel and the second channel" includes any one or any combinations of the following cases: (1) only a part of the first channel; (2) only a part of the second channel; (3) only an entirety of the first channel; (4) only an entirety of the second channel; (5) a part of the first channel and a part of the second channel; (6) a part of the first channel and an entirety of the second channel; (7) an entirety of the first channel and a part of the second channel; (8) an entirety of the first channel and an entirety of the second channel.

Generally speaking, a total length of the at least part of the at least one of the first channel and the second channel to be shortened should be substantially equal to, or more than a total length of possible collision between the first channel and the second channel. This total length of possible collision between the first channel and the second channel can be calculated based on a delay time from transmission from the first node to reception at the second node or from transmission from the second node to reception at the first node.

In an embodiment, the first channel and the second channel may be assigned with priorities according to the characteristics of the first channel and the second channel, wherein the step S301 includes a following step of: in a case that one of the first channel and the second channel is assigned with a lower priority then another of the first channel and the second channel, determining a part of the one of the first channel and the second channel to be shortened and determining a part of the another of the first channel and the second channel not to be shortened; or in a case that one of the first channel and the second channel is assigned with a lower priority then another of the first channel and the second channel, determining a longer part of the one of the first channel and second channel to be shortened and determining a shorter part of the another of the first channel and the second channel to be shortened.

Thus, the first channel and the second channel are assigned with priorities respectively, so that a part of a channel with a lower priority can be shortened, while the other channel with a higher priority is maintained without being shortened, or a longer part of a channel with a lower priority can be shortened, while a shorter part of the other channel with a higher priority can be shortened, so that an entirety or a part of the other channel with a higher priority can reserved, without losing information of the other channel with a higher priority.

In an embodiment, the characteristics of the first channel and the second channel may include types of the first channel and the second channel.

In an embodiment, the types of the first channel and the second channel may include at least one of Random Access Channel (RACH), channel including Reference Signal (RS), control channel, physical shared channel (PSCH) and so on. The PSCH is used to transmit user traffic or user data/information as PDSCH or PUSCH defined in the 3GPP standard.

In an embodiment, it is configured that a priority of the PSCH is lower than a priority of the control channel, the priority of the control channel is lower than a priority of the channel including RS at a possible collision part, and the priority of the channel including RS at a possible collision part is lower than a priority of the RACH. Here the channel including RS at a possible collision part means that the RS is transmitted at the end of the first channel or at the beginning of the second channel which is the possible collision part, which may need to be punctured or rate matched. Since the RS may be included at other positions in the channel, if the possible collision part does not include the RS, such channel can be treated as PSCH, but not as the channel including RS at a possible collision part. Because if the possible collision part does not include the RS, the RS will not be punctured or rate matched, so there is no need to protect such RS.

As such, RACH channel can be treated as being more important than the channel including RS at a possible collision part, and the channel including RS at a possible collision part can be treated as being more important than the control channel, and the control channel can be treated as being more important than the PSCH channel, so that the more important channel can be maintained without being shortened, or without being shortened too much, to avoid losing all the information or too much information of the more important channel.

In an embodiment, the characteristics of the first channel and the second channel may include Transmission Time Interval (TTI) lengths of the first channel and the second channel. TTI is a parameter related to encapsulation of data from higher layers into frames for transmission on the radio link layer. TTI refers to the length of an independently decodable transmission on the radio link. The TTI is related to the size of the data blocks passed from the higher network layers to the radio link layer.

In an embodiment, one of the first channel and the second channel which has a longer TTI length may be assigned with a lower priority than another of the first channel and the second channel which has a shorter TTI length.

As such, the channel which has a shorter TTI length can be treated as being more important than the channel which has a longer TTI length, so that the more important channel can be maintained without being shortened, or without being shortened too much, to avoid losing all the information or too much information of the more important channel.

In an embodiment, the characteristics of the first channel and the second channel may include coding rates of the first channel and the second channel.

In an embodiment, one of the first channel and the second channel which has a lower coding rate may be assigned with a lower priority than another of the first channel and the second channel which has a higher coding rate.

As such, the channel which has a higher coding rate can be treated as being more important than the channel which has a lower coding rate, so that the more important channel can be maintained without being shortened, or without being shortened too much, to avoid losing all the information or too much information of the more important channel.

In another embodiment, the characteristics of the first channel and the second channel may include a combination of at least two of the types of the first channel and the second channel, the TTI lengths of the first channel and the second channel, and the coding rates of the first channel and the second channel.

Figure 4:
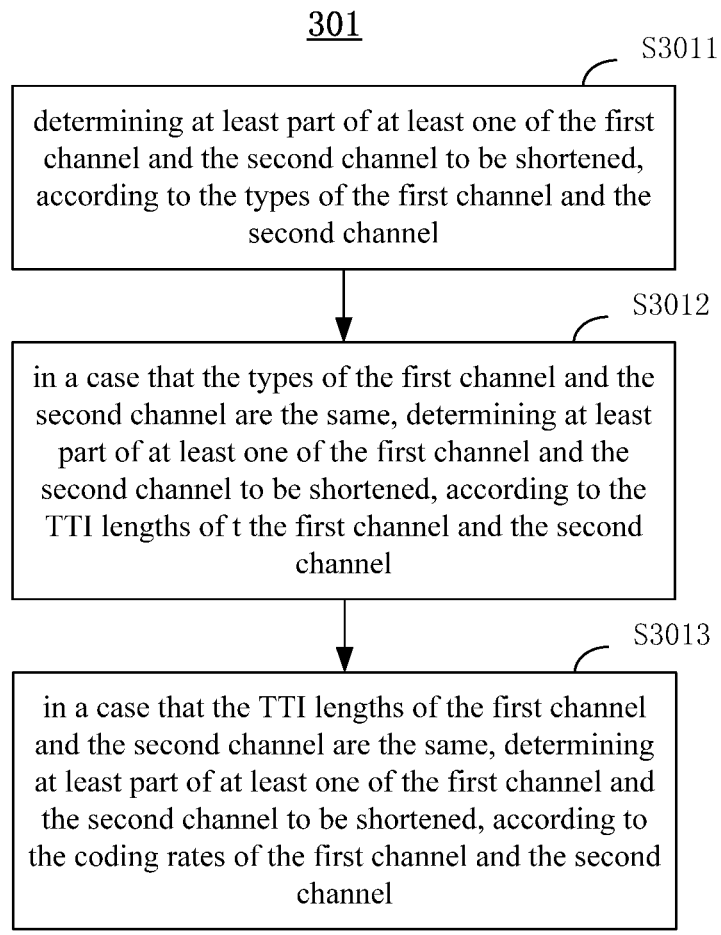
FIG. 4 shows a flowchart of a determining step of the wireless communication method as shown in FIG. 3 according to another embodiment of the present disclosure.

FIG. 4 shows a flowchart of a determining step of the wireless communication method as shown in FIG. 3 according to another embodiment of the present disclosure.

In this case, as shown in FIG. 4, the step of determining S301 may include: step S3011, determining at least part of at least one of the first channel and the second channel to be shortened, according to the types of the first channel and the second channel; step S3012, in a case that the types of the first channel and the second channel are the same, determining at least part of at least one of the first channel and the second channel to be shortened, according to the TTI lengths of t the first channel and the second channel; and step S3013, in a case that the TTI lengths of the first channel and the second channel are the same, determining at least part of at least one of the first channel and the second channel to be shortened, according to the coding rates of the first channel and the second channel.

This means that in the case of combining the types of the first channel and the second channel, the TTI lengths of the first channel and the second channel, and the coding rates of the first channel and the second channel together, to determine at least part of at least one of the first channel and the second channel to be shortened, there is a determination order for the three characteristics, i.e., first, the types, second, the TTI lengths and third, the coding rates.

Of course, the above order for the three characteristics is only an example, but not limitation. Actually, other orders for the three characteristics can be available. Furthermore, the above example describes the combination of all the three characteristics, but this is only an example, but not limitation. Actually, other combinations of any two of the three characteristics can be available, and the orders for the combinations of any two of the three characteristics can also be available.

In an embodiment, the step S301 of determining may include: determining an end part of the second channel to be shortened.

Thus, the end part of the second channel is always determined to be shortened. Normally, the data including the first channel transmitted from the second node to the first node may include important information, such as RS, so the first channel is not shortened, but the end part of the second channel is always shortened to protect the RS included in the first channel.

In this case, a timing for starting to transmit the second channel may be based on a timing for completing receiving of the first channel. In particular, the timing for starting to transmit the second channel may be at the timing for completing receiving of the first channel, which means that the timing for starting to transmit the second channel and the timing for completing receiving of the first channel may be at the same time, or alternatively, a time interval between the timing for starting to transmit the second channel and the timing for completing receiving of the first channel may be shorter than a threshold, which means that the timing for starting to transmit the second channel and the timing for completing receiving of the first channel may be close to each other, but not necessarily at the same time.

Thus, in the case that the second channel is started to be transmitted immediately after completing receiving of the first channel, due to the transmittance delay time, the end part of second channel received at the second node may collide with the beginning part of a next data to be transmitted from the second node. Thus, in this embodiment, the end part of the second channel can be always shortened at the first node to prevent the possible collision at the second node.

In an embodiment, the step S301 of determining may include: determining an end part of the first channel not to be shortened, in a case that there is no next data to be transmitted from the first node.

Thus, since the first channel is transmitted from the second node and received at the first node. So if the first node determines that there is no next data to be transmitted from the first node, the first node does not shorten the received first channel, because no collision would occur at the first node.

In another embodiment, the step S301 of determining may include: determining an end part of the second channel not to be shortened, in a case that the first node is notified that there is no next data to be received at the first node.

In this case, if there is no next data to be received at the first node (for example, the first node is notified by a second node about that there is no next data to be transmitted from the second node to the first node), then the first node may not shorten the end of the second channel to be transmitted to the second node, because no collision would occur at the second node when the second channel arrives at the second node.

This embodiment includes two cases: (1) the first node is a UE, the second channel transmitted from the first node is for example, the uplink channel; (2) the first node is an eNB. For the first case (1), the first node, UE can be notified that there is no next data to be received at the UE, i.e., there is no next data to be transmitted from the eNB, or another UE, so an end part of the second channel, i.e., the end part of the uplink channel will not be shorted, because no collision would occur at the eNB when the uplink channel arrives at the eNB. For the second case (2), the first node is an eNB, the second channel transmitted from the first node is for example, the downlink channel. However, by now, the eNB cannot be notified by the UE, because in the current standard or in the current practical use, it is specified that the eNB is in charge of management and scheduling But in the future, it may be possible that the UE is capable of notifying something to the eNB based on some new access schemes. In this sense this second case (2) is available. So, if available in the future, the first node, eNB can be notified that there is no next data to be received at the eNB, i.e., there is no next data to be transmitted from the UE, so an end part of the second channel, i.e., the end part of the downlink channel will not be shortened, because no collision would occur at the UE when the downlink channel arrives at the UE.

Figure 5A:
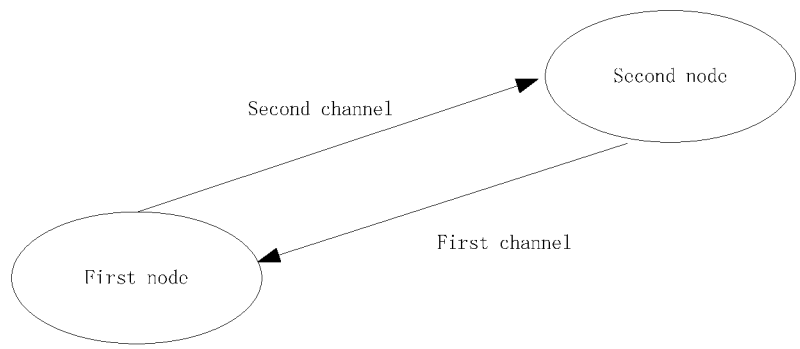
FIGS. 5A and 5B schematically show two scenarios of the first node receiving the first channel and/or transmitting the second channel.
Figure 5B:
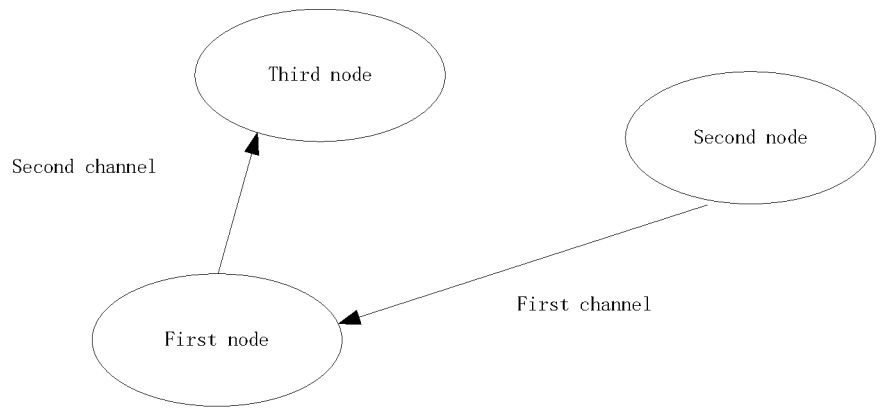

FIGS. 5A and 5B schematically show two scenarios of the first node receiving the first channel and/or transmitting the second channel.

In an embodiment, as shown in FIG. 5A, the first node may be configured to receive the first channel from a second node and/or transmit the second channel to the second node. That is, the first channel and the second channel are between the first node and the second.

In an embodiment, as shown in FIG. 5B, the first node may be configured to receive the first channel from a second node and/or transmit the second channel to a third node. That is, the first channel may be between the first node and the second node, while the second channel may be between the first node and the third node.

Figure 5C:
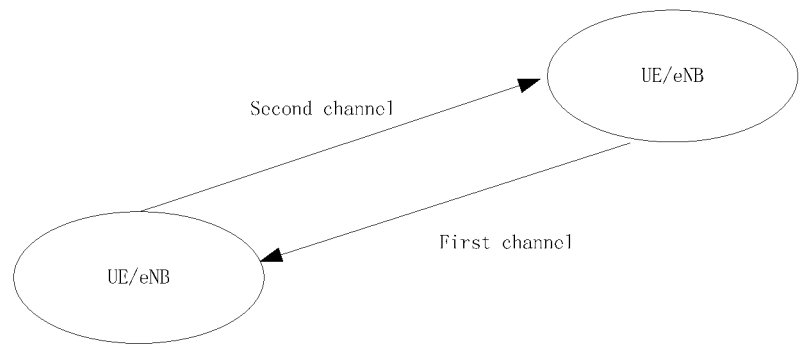
FIGS. 5C and 5D schematically show several scenarios of a UE/eNB receiving the first channel from a UE/eNB and/or transmitting the second channel to a UE/eNB.
Figure 5D:
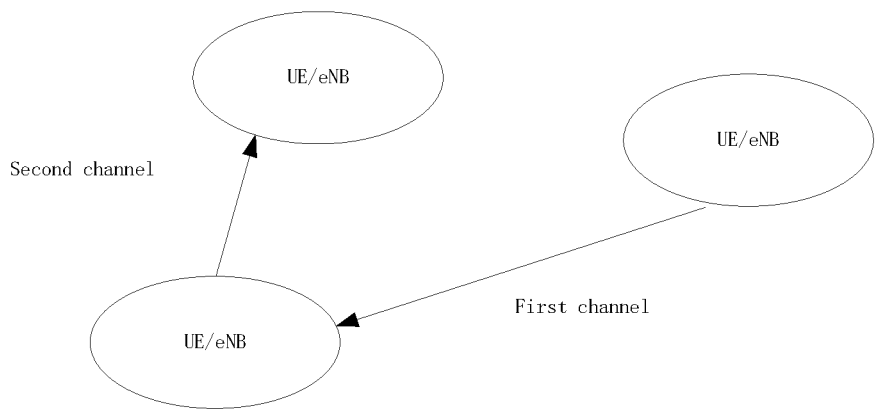

FIGS. 5C and 5D schematically show several scenarios of a UE/eNB receiving the first channel from a UE/eNB and/or transmitting the second channel to a UE/eNB.

In an embodiment, as shown in FIGS. 5C and 5D the first node may be one of a User Equipment (UE) and an Evolved Node B (eNB), the second node may be one of a UE and an eNB, and the third node is one of a UE and an eNB.

In an embodiment, the first channel may be one of a downlink channel, an uplink channel and a sidelink channel; and the second channel may be one of a downlink channel, an uplink channel and a sidelink channel.

FIGS. 5E-5K schematically show several scenarios a UE/eNB receiving one of uplink, downlink, sidelink channels from a UE/eNB and/or transmitting one of uplink, downlink, sidelink channels to a UE/eNB.

Figure 5E:
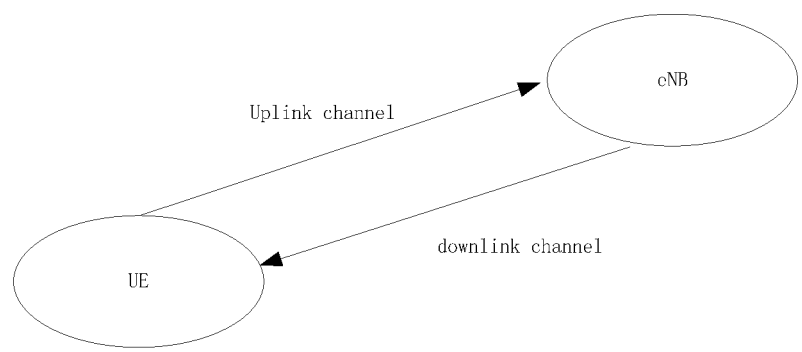
FIGS. 5E-5K schematically show several scenarios a UE/eNB receiving one of uplink, downlink, sidelink channels from a UE/eNB and/or transmitting one of uplink, downlink, sidelink channels to a UE/eNB.

As shown in FIG. 5E, the first node is a UE, the second node is an eNB, the first channel is a downlink channel, and the second channel is an uplink channel.

Figure 5F:
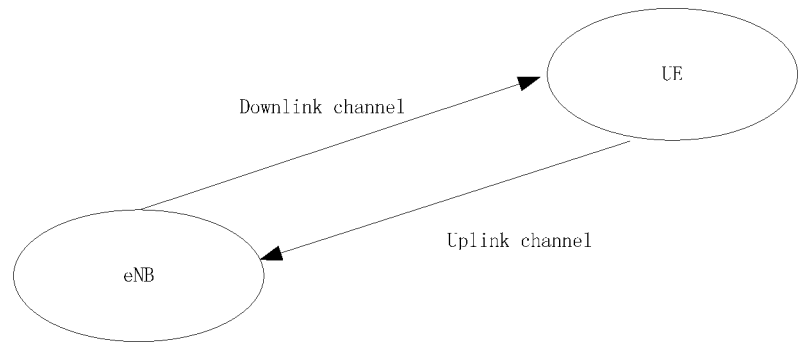

As shown in FIG. 5F, the first node is an eNB, the second node is a UE, the first channel is an uplink channel, and the second channel is a downlink channel.

Figure 5G:
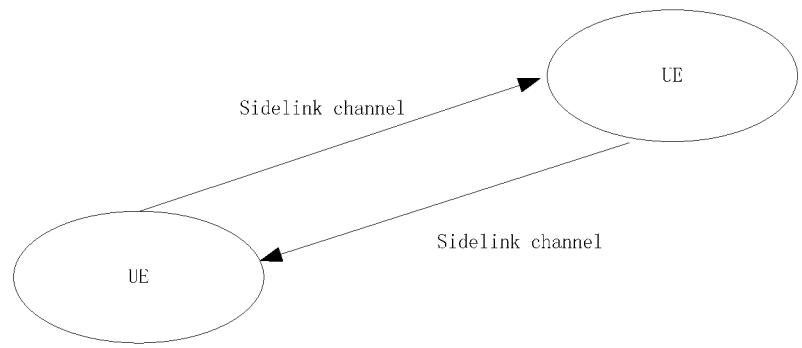

As shown in FIG. 5G, the first node is a UE, the second node is a UE, the first channel is a sidelink channel, and the second channel is a sidelink channel.

Figure 5H:
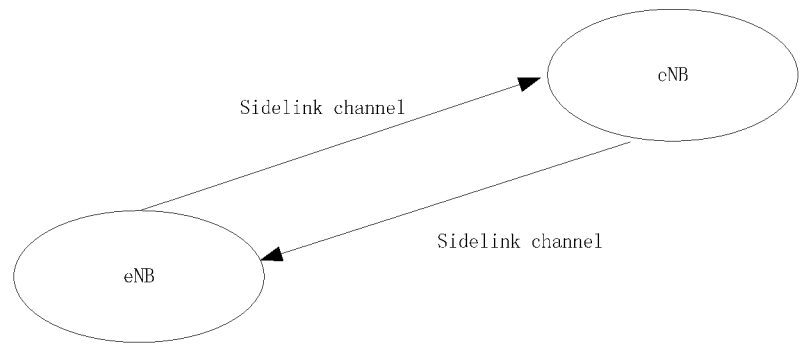

As shown in FIG. 5H, the first node is an eNB, the second node is an eNB, the first channel is a sidelink channel, and the second channel is a sidelink channel.

Figure 5I:
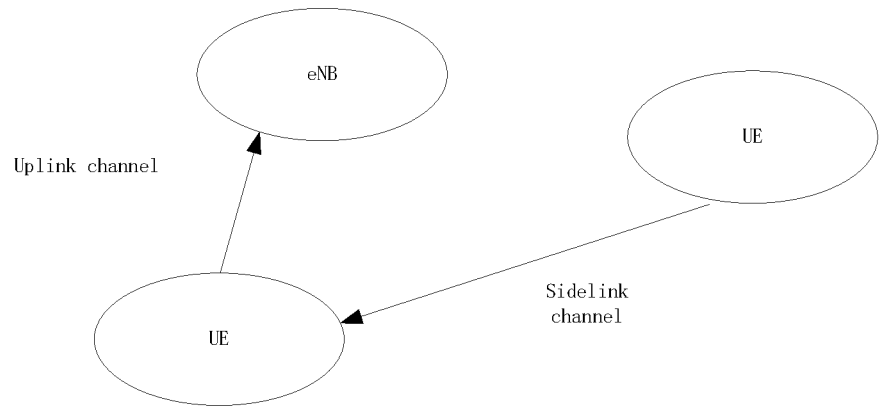

As shown in FIG. 5I, the first node is a UE, the second node is a UE, the third node is an eNB, the first channel is a sidelink channel, and the second channel is an uplink channel.

Figure 5J:
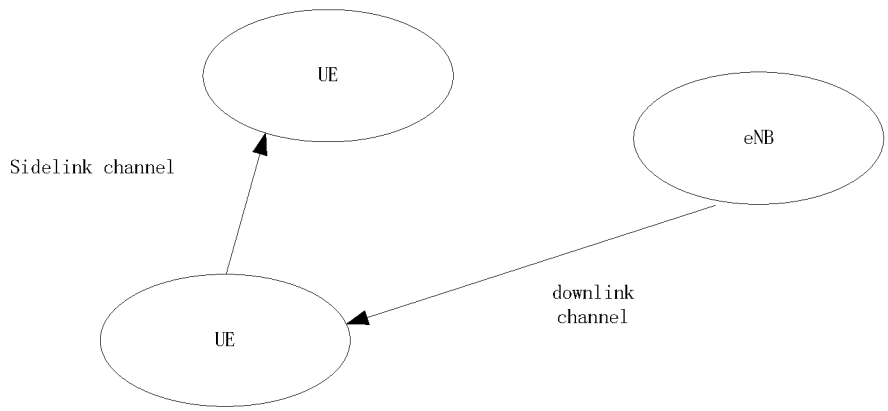

As shown in FIG. 5J, the first node is a UE, the second node is an eNB, the third node is a UE, the first channel is a downlink channel, and the second channel is a sidelink channel.

Figure 5K:
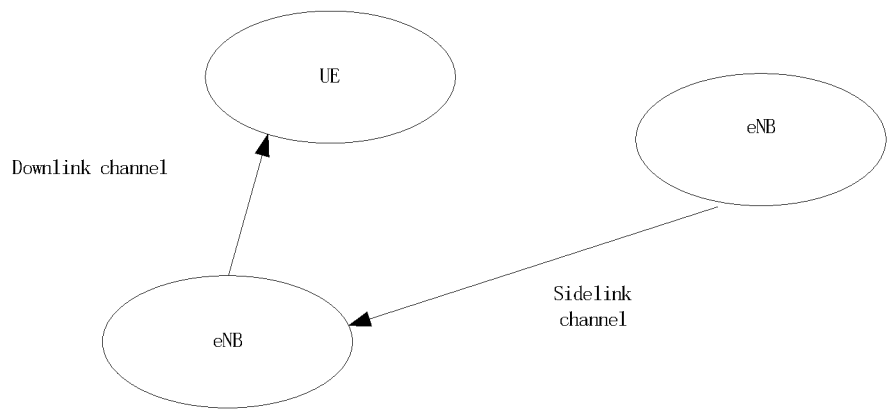

As shown in FIG. 5K, the first node is an eNB, the second node is a UE, the third node is a UE, the first channel is a sidelink channel, and the second channel is a downlink channel.

In an embodiment, the step S302 of shortening may include one of: in response to said determining, puncturing the at least part of the at least one of the first channel and the second channel; or in response to said determining, rate matching the at least part of the at least one of the first channel and the second channel.

In this embodiment, the shortening includes puncturing or rate matching, but the shortening is not limited to these. In other cases, the shortening may include other ways to shorten a length of data, for example, puncturing plus rate matching and so on.

In all the embodiments of the present disclosure, the above-mentioned priority rule could be Radio Resource Control (RRC) configured or specified in a standard specification. Whether puncturing or rate matching is used for handling DL-UL switching could be pre-configured, and be RRC configured or indicated via Medium Access Control (MAC)/L1 grant.

What characteristic of the channel is used could also be indicated/configured by RRC/MAC/L1 grant.

In addition, the proposed solutions or embodiments discussed herein and included in the attached claims could be applied for both LTE and NR or could be scenario specific for example:

the characteristic of the channel including the type of the channel can be applied for LTE, and the characteristic of the channel including TTI length or coding rate can be applied for NR.

In another embodiment, what characteristic of the channel is used could be based on a timing advance (TA) value indicated by eNB. For example, if TA>x (a threshold), the characteristic of the channel including the type of the channel is applied to handle DL-UL switching and if TA<=x, the characteristic of the channel including TTI length or coding rate is used for handling DL-UL switching. The threshold x could be configured by eNB or specified in the standard specification. As an example, x equals to 0.

However, the above embodiments and examples are only for illustrative, but not for limitative. Other alternative embodiments can be applied within the concept of the present disclosure.

Thus, according to the embodiments of the present disclosure, it is possible to dynamically determine at least part of at least one of the first channel and the second channel to be shortened, according to characteristic of the at least one of the first channel and the second channel, without fixedly shortening a fixed part of a fixed channel, thereby avoiding interference or collision between the first channel and the second channel.

The following description will be described with respect to three particular embodiments of the present disclosure, so as to make the present disclosure more apparent and more comprehensive, but not for limitation.

Figure 6:
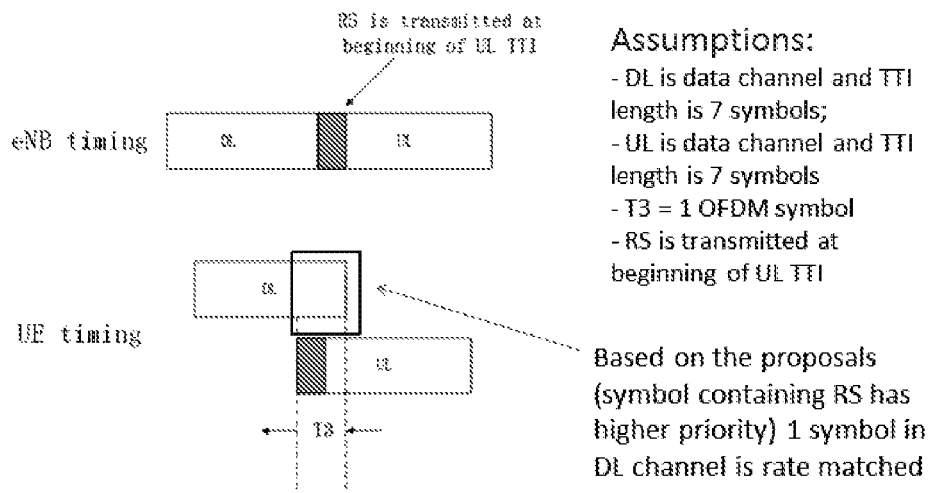
FIG. 6 shows a schematic diagram for explaining a first embodiment of the present disclosure.

FIG. 6 shows a schematic diagram for explaining a first particular embodiment of the present disclosure.

In the first particular embodiment, it is assumed that the first node is a UE configured to receive a first channel from and/or transmit a second channel to the second node, and the second node is an eNB, and the first channel is a downlink channel (referred to as DL channel below), and the second channel is a uplink channel (referred to as UL channel below).

For example, the assumption is that the DL channel is a physical shared channel (PSCH) (or generally called as data channel) and the TTI length of the DL channel is 7 symbols. The UL channel is a channel including Reference Signal (RS) (or generally called as RS channel) and the TTI length of the UL channel is 7 symbols. That means that the TTI lengths for the DL channel and the UL channel are the same. The RS signal is normally transmitted at the beginning of UL channel. So, if no shortening (including puncturing or rate matching) is done, the collided part between DL reception channel and UL transmission channel may be 1 OFDM symbol.

According to the present embodiment, the wireless communication method includes determining at least part of at least one of the first channel and the second channel to be shortened, according to characteristic of the at least one of the first channel and the second channel. The first channel and the second channel are assigned with priorities according to the characteristics of the first channel and the second channel, wherein the step of determining includes a following step of: in a case that one of the first channel and the second channel is assigned with a lower priority then another of the first channel and the second channel, determining a part of the one of the first channel and the second channel to be shortened and determining a part of the another of the first channel and the second channel not to be shortened. And the characteristics of the first channel and the second channel include types of the first channel and the second channel. A priority of the PSCH is lower than a priority of the control channel, the priority of the control channel is lower than a priority of the channel including RS at a possible collision part, and the priority of the channel including RS at a possible collision part is lower than a priority of the RACH.

Thus, the RS channel has higher priority than the PSCH channel. So the 1 symbol in the DL channel (the possible collision part) will be shortened, for example, punctured or rate matched. As such, the RS signal in the uplink channel can be protected and the performance loss is minimized.

Figure 7:
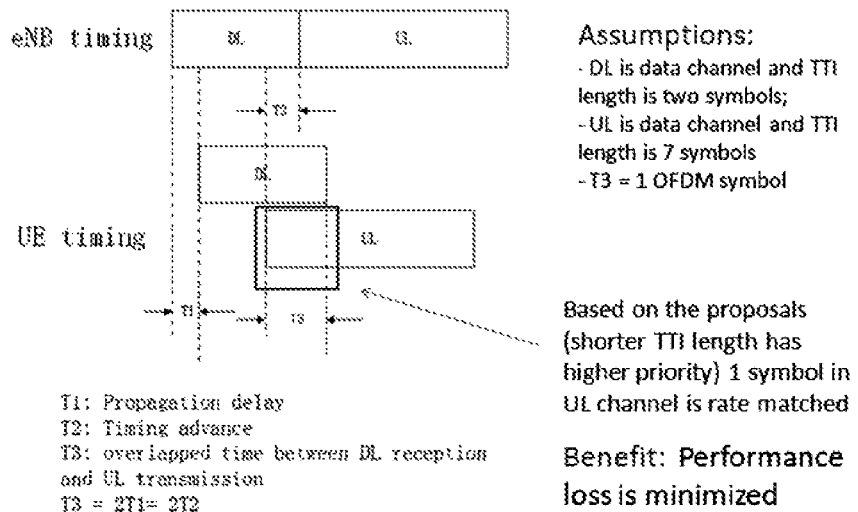
FIG. 7 shows a schematic diagram for explaining a second embodiment of the present disclosure.

FIG. 7 shows a schematic diagram for explaining a second particular embodiment of the present disclosure.

In the second particular embodiment, it is also assumed that the first node is a UE configured to receive a first channel from and/or transmit a second channel to the second node, and the second node is an eNB, and the first channel is a downlink channel (referred to as DL channel below), and the second channel is a uplink channel (referred to as UL channel below).

The assumption is that the DL channel is a PSCH channel (or called as data channel) and the TTI length is 2 symbols;

the UL channel is a PSCH channel (or called as data channel) and the TTI length is 7 symbols (this means that the types of the DL channel and the UL channel are the same, but the TTI lengths of the DL channel and the UL channel are different, and the TTI length of the DL channel is shorter than the TTI length of the UL channel);

As shown in FIG. 7, the time T1 is a propagation delay and the time T2 is a timing advance at the eNB side.

the time T3 means that a possible collision between the DL reception channel and the UL transmission channel is 1 OFDM symbol, and the relation among T1, T2 and T3 is that T3=2T1=2T2.

In this embodiment, the wireless communication method includes determining at least part of at least one of the first channel and the second channel to be shortened, according to characteristic of the at least one of the first channel and the second channel. The first channel and the second channel are assigned with priorities according to the characteristics of the first channel and the second channel, wherein the step of determining includes a following step of: in a case that one of the first channel and the second channel is assigned with a lower priority then another of the first channel and the second channel, determining a part of the one of the first channel and the second channel to be shortened and determining a part of the another of the first channel and the second channel not to be shortened. The characteristics of the first channel and the second channel include Transmission Time Interval (TTI) lengths of the first channel and the second channel. One of the first channel and the second channel which has a longer TTI length is assigned with a lower priority than another of the first channel and the second channel which has a shorter TTI length.

As such, the channel which has a shorter TTI has a higher priority and the channel which has a longer TTI has a lower priority, so the UL channel whose TTI length is 7 symbols will be shortened for DL-UL switching point. Therefore, 1 symbol in the UL channel (the possible collision part) will be shortened, for example, punctured or rate matched. The benefit of this embodiment is that the performance loss can be minimized.

Figure 8:
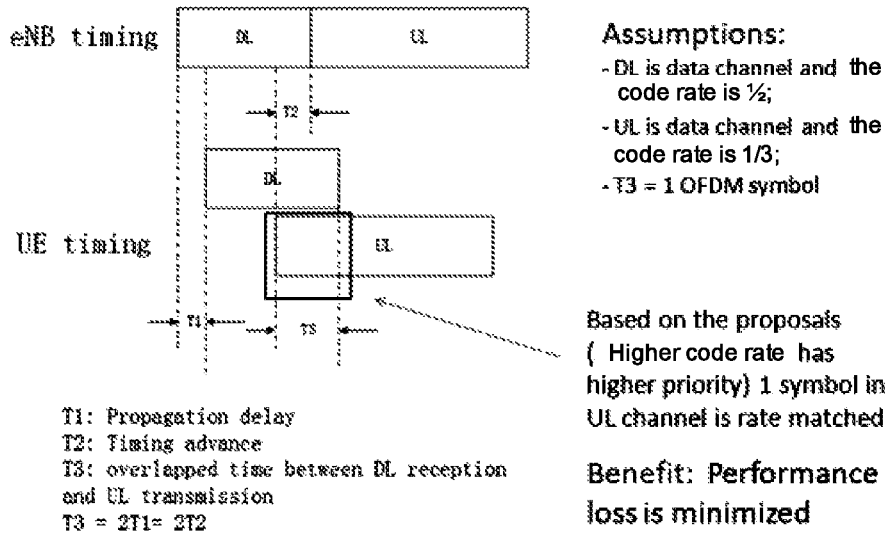
FIG. 8 shows a schematic diagram for explaining a third embodiment of the present disclosure.

FIG. 8 shows a schematic diagram for explaining a third particular embodiment of the present disclosure.

In the third particular embodiment, it is also assumed that the first node is a UE configured to receive a first channel from and/or transmit a second channel to the second node, and the second node is an eNB, and the first channel is a downlink channel (referred to as DL channel below), and the second channel is a uplink channel (referred to as UL channel below).

The assumption is that the DL channel is a PSCH channel (or called as data channel) and the code rate is 1/2;

the UL channel is a PSCH channel (or called as data channel) and the code rate is 1/3 (this means that the types of the DL channel and the UL channel are the same, but the code rates of the DL channel and the UL channel are different, and the code rate of the DL channel is higher than the code rate of the UL channel);

As shown in FIG. 8, the time T1 is a propagation delay and the time T2 is a timing advance at the eNB side.

the time T3 means that a possible collision between the DL reception channel and the UL transmission channel is 1 OFDM symbol, and the relation among T1, T2 and T3 is that T3=2T1=2T2.

In this embodiment, the wireless communication method includes determining at least part of at least one of the first channel and the second channel to be shortened, according to characteristic of the at least one of the first channel and the second channel. The first channel and the second channel are assigned with priorities according to the characteristics of the first channel and the second channel, wherein the step of determining includes a following step of: in a case that one of the first channel and the second channel is assigned with a lower priority then another of the first channel and the second channel, determining a part of the one of the first channel and the second channel to be shortened and determining a part of the another of the first channel and the second channel not to be shortened. The characteristics of the first channel and the second channel include coding rates of the first channel and the second channel. One of the first channel and the second channel which has a lower coding rate is assigned with a lower priority than another of the first channel and the second channel which has a higher coding rate.

As such, the channel which has a higher coding rate has a higher priority, and the channel which has a lower coding rate has a lower priority, so the UL channel whose code rate is 1/3 will be shortened for DL-UL switching point. Therefore, 1 symbol in the UL channel (the possible collision part) will be shortened, for example, punctured or rate matched. The benefit of this embodiment is that the performance loss can be minimized.

Figure 9:
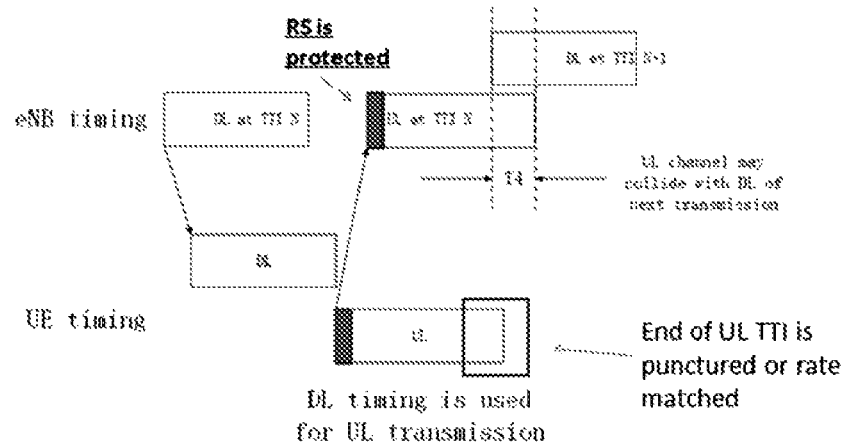
FIG. 9 shows a schematic diagram for explaining a fourth embodiment of the present disclosure.

FIG. 9 shows a schematic diagram for explaining a fourth embodiment of the present disclosure.

In the fourth embodiment, it is also assumed that the first node is a UE configured to receive a first channel from and/or transmit a second channel to the second node, and the second node is an eNB, and the first channel is a downlink channel (referred to as DL channel below), and the second channel is a uplink channel (referred to as UL channel below).

In this embodiment, the wireless communication method includes determining at least part of at least one of the first channel and the second channel to be shortened, according to characteristic of the at least one of the first channel and the second channel. The first channel and the second channel are assigned with priorities according to the characteristics of the first channel and the second channel, wherein the step of determining includes a following step of: in a case that one of the first channel and the second channel is assigned with a lower priority then another of the first channel and the second channel, determining a part of the one of the first channel and the second channel to be shortened and determining a part of the another of the first channel and the second channel not to be shortened. The step of determining includes: determining an end part of the second channel to be shortened. A timing for starting to transmit the second channel is based on a timing for completing receiving of the first channel. The timing for starting to transmit the second channel is at the timing for completing receiving of the first channel.

Thus, it will not handle the DL channel or the UL channel around the switching point. Instead, at the UE side, the UL transmission timing is based on the DL reception timing, for example, the UL transmission timing is at the DL reception timing. As shown in FIG. 9, the eNB transmits the DL channel at a TTI length of N. The UE transmits the UL channel based on the DL reception timing, for example at the DL reception timing. At the eNB side, such UL reception may collide with the next DL transmission. In FIG. 9, the length of the collided part is interpreted as a time T4. Actually the collision part is switched to the UL reception and the next DL transmission at the eNB side. In this case, the UL channel is shortened (for example, punctured or rate matched) to avoid the possible collision. The benefit of such case is that the RS which will be transmitted at the beginning of the UL transmission channel is always protected.

Thus, according to the embodiments of the present disclosure, it is possible to dynamically determine at least part of at least one of the first channel and the second channel to be shortened, according to characteristic of the at least one of the first channel and the second channel, without fixedly shortening a fixed part of a fixed channel, thereby avoiding interference or collision between the first channel and the second channel.

Figure 10:
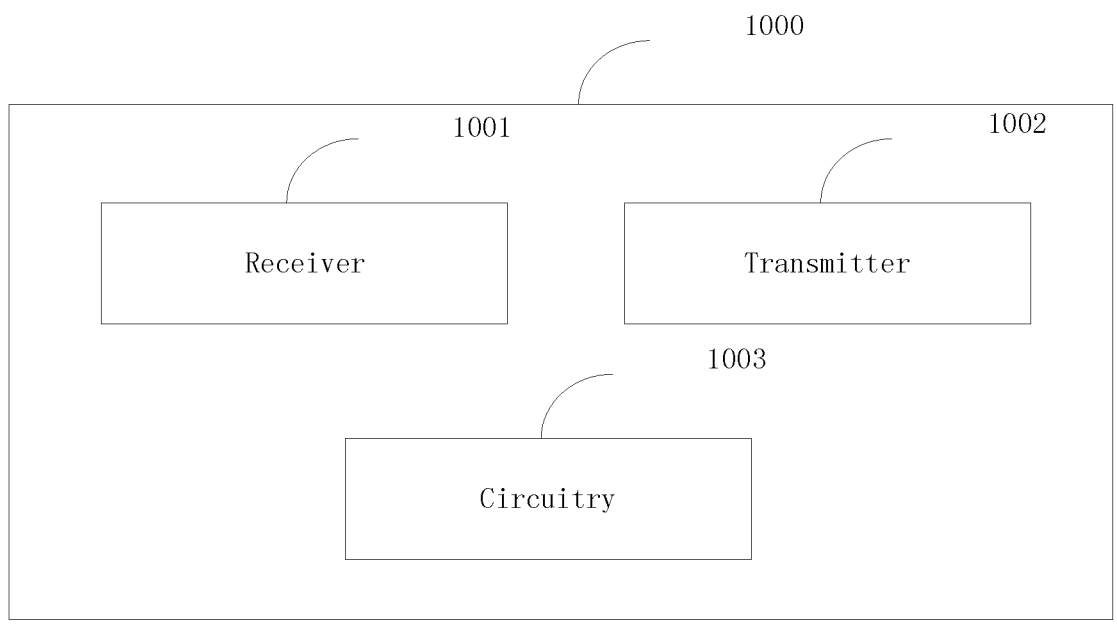
FIG. 10 shows a block diagram of a wireless communication apparatus according to an embodiment of the present disclosure.

FIG. 10 shows a block diagram of a wireless communication apparatus according to an embodiment of the present disclosure.

As shown in FIG. 10, the apparatus 1000, at a first node configured to receive a first channel and/or transmit a second channel, comprises: a receiver 1001, which in operation, receives a first channel; a transmitter 1002, which in operation, transmits a second channel; a circuitry, which, in operation, determines at least part of at least one of the first channel and the second channel to be shortened, according to characteristic of the at least one of the first channel and the second channel, and in response to said determining, shortens the at least part of the at least one of the first channel and the second channel.

In an embodiment, the first channel and the second channel may be assigned with priorities according to the characteristics of the first channel and the second channel, wherein the circuitry 1003, which, in operation: in a case that one of the first channel and the second channel is assigned with a lower priority then another of the first channel and the second channel, determines a part of the one of the first channel and the second channel to be shortened and determines a part of the another of the first channel and the second channel not to be shortened; or in a case that one of the first channel and the second channel is assigned with a lower priority then another of the first channel and the second channel, determines a longer part of the one of the first channel and second channel to be shortened and determine a shorter part of the another of the first channel and the second channel to be shortened.

In an embodiment, the characteristics of the first channel and the second channel may include types of the first channel and the second channel.

In an embodiment, the types of the first channel and the second channel may include at least one of Random Access Channel (RACH), channel including Reference Signal (RS), control channel, physical shared channel (PSCH).

In an embodiment, a priority of the PSCH may be lower than a priority of the control channel, the priority of the control channel may be lower than a priority of the channel including RS at a possible collision part, and the priority of the channel including RS at a possible collision part may be lower than a priority of the RACH.

In an embodiment, the characteristics of the first channel and the second channel may include Transmission Time Interval (TTI) lengths of the first channel and the second channel.

In an embodiment, one of the first channel and the second channel which has a longer TTI length may be assigned with a lower priority than another of the first channel and the second channel which has a shorter TTI length.

In an embodiment, the characteristics of the first channel and the second channel may include coding rates of the first channel and the second channel.

In an embodiment, one of the first channel and the second channel which has a lower coding rate may be assigned with a lower priority than another of the first channel and the second channel which has a higher coding rate.

In an embodiment, the characteristics of the first channel and the second channel may include a combination of at least two of types of the first channel and the second channel, TTI lengths of the first channel and the second channel, and coding rates of the first channel and the second channel.

In an embodiment, the circuitry 1003, which, in operation: determines at least part of at least one of the first channel and the second channel to be shortened, according to the types of the first channel and the second channel; in a case that the types of the first channel and the second channel are the same, determines at least part of at least one of the first channel and the second channel to be shortened, according to the TTI lengths oft the first channel and the second channel; and in a case that the TTI lengths of the first channel and the second channel are the same, determines at least part of at least one of the first channel and the second channel to be shortened, according to the coding rates of the first channel and the second channel.

In an embodiment, the circuitry, which, in operation: determines an end part of the second channel to be shortened.

In an embodiment, a timing for starting to transmit the second channel may be based on a timing for completing receiving of the first channel.

In an embodiment, the timing for starting to transmit the second channel may be at the timing for completing receiving of the first channel, or a time interval between the timing for starting to transmit the second channel and the timing for completing receiving of the first channel may be shorter than a threshold.

In an embodiment, the circuitry, which, in operation performs at least one of:

determining an end part of the first channel not to be shortened, in a case that there is no next data to be transmitted from the first node; and determining an end part of the second channel not to be shortened, in a case that the first node is notified that there is no next data to be received at the first node.

In an embodiment, the receiver 1001, which, in operation, receives the first channel from a second node, and the transmitter 1002, which, in operation, transmits the second channel to a third node, and the first node may be one of a User Equipment (UE) and an Evolved Node B (eNB), the second node may be one of a UE and an eNB, and the third node may be one of a UE and an eNB.

In an embodiment, the first channel may be one of a downlink channel, an uplink channel and a sidelink channel; and the second channel may be one of a downlink channel, an uplink channel and a sidelink channel.

In an embodiment, the circuitry 1003, which, in operation, performs one of: in response to said determining, puncturing the at least part of the at least one of the first channel and the second channel; or in response to said determining, rate matching the at least part of the at least one of the first channel and the second channel.

Thus, according to the embodiments of the present disclosure, it is possible to dynamically determine at least part of at least one of the first channel and the second channel to be shortened, according to characteristic of the at least one of the first channel and the second channel, without fixedly shortening a fixed part of a fixed channel, thereby avoiding interference or collision between the first channel and the second channel.

Figure 11:
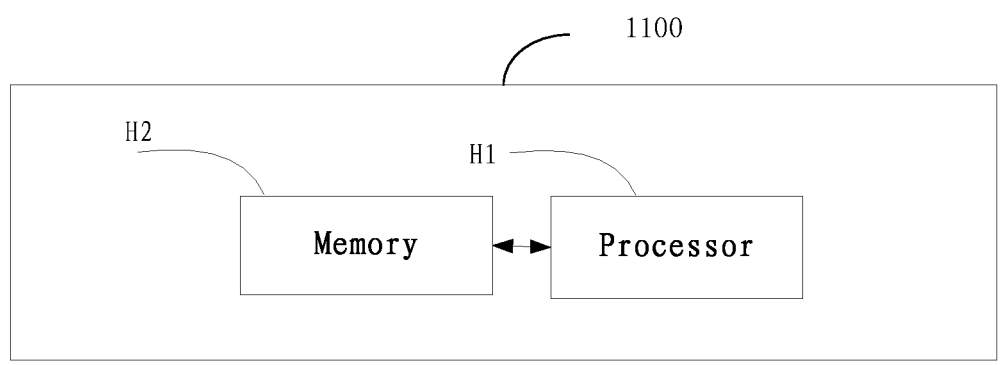
FIG. 11 shows a block diagram of a wireless communication system according to an embodiment of the present disclosure.

FIG. 11 shows a block diagram of a wireless communication system 1100 according to an embodiment of the present disclosure.

As shown in FIG. 11, the wireless communication system 1100, at a first node configured to receive a first channel and/or transmit a second channel, comprises: a processor H1; a memory H2 storing computer executable instructions, when run by the processor, to perform steps of: determining at least part of at least one of the first channel and the second channel to be shortened, according to characteristic of the at least one of the first channel and the second channel; and in response to said determining, shortening the at least part of the at least one of the first channel and the second channel. The memory H2 can store computer executable instructions, when run by the processor, to further perform the steps of embodiments of the wireless communication method as described above. Details are omitted to avoid redundancy.

Thus, according to the embodiments of the present disclosure, it is possible to dynamically determine at least part of at least one of the first channel and the second channel to be shortened, according to characteristic of the at least one of the first channel and the second channel, without fixedly shortening a fixed part of a fixed channel, thereby avoiding interference or collision between the first channel and the second channel.

Embodiments of the present disclosure can at least provide the following subject matters.

(1). An apparatus, at a first node configured to receive a first channel and/or transmit a second channel, comprising: a receiver, which in operation, receives a first channel; a transmitter, which in operation, transmits a second channel; a circuitry, which, in operation, determines at least part of at least one of the first channel and the second channel to be shortened, according to characteristic of the at least one of the first channel and the second channel, and, in response to said determining, shortens the at least part of the at least one of the first channel and the second channel.

(2). The apparatus according to (1), wherein the first channel and the second channel are assigned with priorities according to the characteristics of the first channel and the second channel, wherein the circuitry, which, in operation: in a case that one of the first channel and the second channel is assigned with a lower priority then another of the first channel and the second channel, determines a part of the one of the first channel and the second channel to be shortened and determines a part of the another of the first channel and the second channel not to be shortened; or in a case that one of the first channel and the second channel is assigned with a lower priority then another of the first channel and the second channel, determines a longer part of the one of the first channel and second channel to be shortened and determines a shorter part of the another of the first channel and the second channel to be shortened.

(3). The apparatus according to (2), wherein the characteristics of the first channel and the second channel include types of the first channel and the second channel.

(4). The apparatus according to (3), wherein the types of the first channel and the second channel include at least one of Random Access Channel (RACH), channel including Reference Signal (RS), control channel, physical shared channel (PSCH).

(5). The apparatus according to (4), wherein a priority of the PSCH is lower than a priority of the control channel, the priority of the control channel is lower than a priority of the channel including RS at a possible collision part, and the priority of the channel including RS at a possible collision part is lower than a priority of the RACH.

(6). The apparatus according to (2), wherein the characteristics of the first channel and the second channel include Transmission Time Interval (TTI) lengths of the first channel and the second channel.

(7). The apparatus according to (6), wherein one of the first channel and the second channel which has a longer TTI length is assigned with a lower priority than another of the first channel and the second channel which has a shorter TTI length.

(8). The apparatus according to (2), wherein the characteristics of the first channel and the second channel include coding rates of the first channel and the second channel.

(9). The apparatus according to (8), wherein one of the first channel and the second channel which has a lower coding rate is assigned with a lower priority than another of the first channel and the second channel which has a higher coding rate.

(10). The apparatus according to (2), wherein the characteristics of the first channel and the second channel include a combination of at least two of types of the first channel and the second channel, TTI lengths of the first channel and the second channel, and coding rates of the first channel and the second channel.

(11). The apparatus according to (10), wherein the circuitry, which, in operation: determines at least part of at least one of the first channel and the second channel to be shortened, according to the types of the first channel and the second channel; in a case that the types of the first channel and the second channel are the same, determines at least part of at least one of the first channel and the second channel to be shortened, according to the TTI lengths of t the first channel and the second channel; and in a case that the TTI lengths of the first channel and the second channel are the same, determines at least part of at least one of the first channel and the second channel to be shortened, according to the coding rates of the first channel and the second channel.

(12). The apparatus according to (1), wherein the circuitry, which, in operation: determines an end part of the second channel to be shortened.

(13). The apparatus according to claim 12), wherein a timing for starting to transmit the second channel is based on a timing for completing receiving of the first channel.

(14). The apparatus according to (13), wherein the timing for starting to transmit the second channel is at the timing for completing receiving of the first channel, or a time interval between the timing for starting to transmit the second channel and the timing for completing receiving of the first channel is shorter than a threshold.

(15). The apparatus according to (1), wherein the circuitry, which, in operation, performs at least one of: determining an end part of the first channel not to be shortened, in a case that there is no next data to be transmitted from the first node; and determining an end part of the second channel not to be shortened, in a case that the first node is notified that there is no next data to be received at the first node.

(16). The apparatus according to (1), wherein the receiver, which, in operation, receives the first channel from a second node, and the transmitter, which, in operation, transmits the second channel to a third node, and wherein the first node is one of a User Equipment (UE) and an Evolved Node B (eNB), the second node is one of a UE and an eNB, and the third node is one of a UE and an eNB.

(17). The apparatus according to (1), wherein the first channel is one of a downlink channel, an uplink channel and a sidelink channel; and the second channel is one of a downlink channel, an uplink channel and a sidelink channel.

(18). The apparatus according to (1), wherein the circuitry, which, in operation, performs one of: in response to said determining, puncturing the at least part of the at least one of the first channel and the second channel; or in response to said determining, rate matching the at least part of the at least one of the first channel and the second channel.

(19). A system, at a first node configured to receive a first channel and/or transmit a second channel, comprising: a processor; a memory storing computer executable instructions, when run by the processor, to perform steps of: determining at least part of at least one of the first channel and the second channel to be shortened, according to characteristic of the at least one of the first channel and the second channel; and in response to said determining, shortening the at least part of the at least one of the first channel and the second channel.

(20). The method according to (19), wherein the first channel and the second channel are assigned with priorities according to the characteristics of the first channel and the second channel, wherein the step of determining includes a following step of: in a case that one of the first channel and the second channel is assigned with a lower priority then another of the first channel and the second channel, determining a part of the one of the first channel and the second channel to be shortened and determining a part of the another of the first channel and the second channel not to be shortened; or in a case that one of the first channel and the second channel is assigned with a lower priority then another of the first channel and the second channel, determining a longer part of the one of the first channel and second channel to be shortened and determining a shorter part of the another of the first channel and the second channel to be shortened.

(21). The method according to (20), wherein the characteristics of the first channel and the second channel include types of the first channel and the second channel.

(22). The method according to (21), wherein the types of the first channel and the second channel include at least one of Random Access Channel (RACH), channel including Reference Signal (RS), control channel, physical shared channel (PSCH).

(23). The method according to (22), wherein a priority of the PSCH is lower than a priority of the control channel, the priority of the control channel is lower than a priority of the channel including RS, and the priority of the channel including RS is lower than a priority of the RACH.

(24). The method according to (20), wherein the characteristics of the first channel and the second channel include Transmission Time Interval (TTI) lengths of the first channel and the second channel.

(25). The method according to (24), wherein one of the first channel and the second channel which has a longer TTI length is assigned with a lower priority than another of the first channel and the second channel which has a shorter TTI length.

(26). The method according to (20), wherein the characteristics of the first channel and the second channel include coding rates of the first channel and the second channel.

(27). The method according to (26), wherein one of the first channel and the second channel which has a lower coding rate is assigned with a lower priority than another of the first channel and the second channel which has a higher coding rate.

(28). The method according to (20), wherein the characteristics of the first channel and the second channel include a combination of at least two of types of the first channel and the second channel, TTI lengths of the first channel and the second channel, and coding rates of the first channel and the second channel.

(29). The method according to (28), wherein the step of determining includes: determining at least part of at least one of the first channel and the second channel to be shortened, according to the types of the first channel and the second channel; in a case that the types of the first channel and the second channel are the same, determining at least part of at least one of the first channel and the second channel to be shortened, according to the TTI lengths oft the first channel and the second channel; and in a case that the TTI lengths of the first channel and the second channel are the same, determining at least part of at least one of the first channel and the second channel to be shortened, according to the coding rates of the first channel and the second channel.

(30). The method according to (19), wherein the step of determining includes:
determining an end part of the second channel to be shortened.

(31). The method according to (30), wherein a timing for starting to transmit the second channel is based on a timing for completing receiving of the first channel.

(32). The method according to (31), wherein the timing for starting to transmit the second channel is at the timing for completing receiving of the first channel, or a time interval between the timing for starting to transmit the second channel and the timing for completing receiving of the first channel is shorter than a threshold.

(33). The method according to (19), wherein the step of determining includes at least one of: determining an end part of the first channel not to be shortened, in a case that there is no next data to be transmitted from the first node; and determining an end part of the second channel not to be shortened, in a case that the first node is notified that there is no next data to be received at the first node.

(34). The method according to (19), wherein the first node is configured to receive the first channel from a second node and/or transmit the second channel to a third node, and wherein the first node is one of a User Equipment (UE) and an Evolved Node B (eNB), the second node is one of a UE and an eNB, and the third node is one of a UE and an eNB.

(35). The method according to (19), wherein the first channel is one of a downlink channel, an uplink channel and a sidelink channel; and the second channel is one of a downlink channel, an uplink channel and a sidelink channel.

(36). The method according to (19), wherein the step of shortening includes one of: in response to said determining, puncturing the at least part of the at least one of the first channel and the second channel; or in response to said determining, rate matching the at least part of the at least one of the first channel and the second channel.

(37). A wireless communication method, at a first node configured to receive a first channel and/or transmit a second channel, the method comprising steps of: determining at least part of at least one of the first channel and the second channel to be shortened, according to characteristic of the at least one of the first channel and the second channel; and in response to said determining, shortening the at least part of the at least one of the first channel and the second channel.

(38). The method according to (37), wherein the first channel and the second channel are assigned with priorities according to the characteristics of the first channel and the second channel, wherein the step of determining includes a following step of: in a case that one of the first channel and the second channel is assigned with a lower priority then another of the first channel and the second channel, determining a part of the one of the first channel and the second channel to be shortened and determining a part of the another of the first channel and the second channel not to be shortened; or in a case that one of the first channel and the second channel is assigned with a lower priority then another of the first channel and the second channel, determining a longer part of the one of the first channel and the second channel to be shortened and determining a shorter part of the another of the first channel and the second channel to be shortened.

(39). The method according to (38), wherein the characteristics of the first channel and the second channel include types of the first channel and the second channel.

(40). The method according to (39), wherein the types of the first channel and the second channel include at least one of Random Access Channel (RACH), channel including Reference Signal (RS), control channel, physical shared channel (PSCH).

(41). The method according to (40), wherein a priority of the PSCH is lower than a priority of the control channel, the priority of the control channel is lower than a priority of the channel including RS, and the priority of the channel including RS is lower than a priority of the RACH.

(42). The method according to (38), wherein the characteristics of the first channel and the second channel include Transmission Time Interval (TTI) lengths of the first channel and the second channel.

(43). The method according to (42), wherein one of the first channel and the second channel which has a longer TTI length is assigned with a lower priority than another of the first channel and the second channel which has a shorter TTI length.

(44). The method according to (38), wherein the characteristics of the first channel and the second channel include coding rates of the first channel and the second channel.

(45). The method according to (44), wherein one of the first channel and the second channel which has a lower coding rate is assigned with a lower priority than another of the first channel and the second channel which has a higher coding rate.

(46). The method according to (38), wherein the characteristics of the first channel and the second channel include a combination of at least two of types of the first channel and the second channel, TTI lengths of the first channel and the second channel, and coding rates of the first channel and the second channel.

(47). The method according to (46), wherein the step of determining includes: determining at least part of at least one of the first channel and the second channel to be shortened, according to the types of the first channel and the second channel; in a case that the types of the first channel and the second channel are the same, determining at least part of at least one of the first channel and the second channel to be shortened, according to the TTI lengths oft the first channel and the second channel; and in a case that the TTI lengths of the first channel and the second channel are the same, determining at least part of at least one of the first channel and the second channel to be shortened, according to the coding rates of the first channel and the second channel.

(48). The method according to (37), wherein the step of determining includes: determining an end part of the second channel to be shortened.

(49). The method according to (48), wherein a timing for starting to transmit the second channel is based on a timing for completing receiving of the first channel.

(50). The method according to (49), wherein the timing for starting to transmit the second channel is at the timing for completing receiving of the first channel, or a time interval between the timing for starting to transmit the second channel and the timing for completing receiving of the first channel is shorter than a threshold.

(51). The method according to (37), wherein the step of determining includes at least one of: determining an end part of the first channel not to be shortened, in a case that there is no next data to be transmitted from the first node; and determining an end part of the second channel not to be shortened, in a case that the first node is notified that there is no next data to be received at the first node.

(52). The method according to (37), wherein the first node is configured to receive the first channel from a second node and/or transmit the second channel to a third node, and wherein the first node is one of a User Equipment (UE) and an Evolved Node B (eNB), the second node is one of a UE and an eNB, and the third node is one of a UE and an eNB.

(53). The method according to (37), wherein the first channel is one of a downlink channel, an uplink channel and a sidelink channel; and the second channel is one of a downlink channel, an uplink channel and a sidelink channel.

(54). The method according to (37), wherein the step of shortening includes one of: in response to said determining, puncturing the at least part of the at least one of the first channel and the second channel; or in response to said determining, rate matching the at least part of the at least one of the first channel and the second channel.

Examples of several embodiments of the present disclosure have been described in detail above, with reference to the attached illustrations of specific embodiments. Because it is not possible, of course, to describe every conceivable combination of components or techniques, those skilled in the art will appreciate that various modifications may be made to the above described embodiments without departing from the scope of the present disclosure. For example, it will be readily appreciated that although the above embodiments are described with reference to parts of a 3GPP network, an embodiment of the present disclosure will also be applicable to like networks, such as a successor of the 3GPP network, having like functional components.

Therefore, in particular, the terms 3GPP and associated or related terms used in the above description and in the enclosed drawings and any appended claims now or in the future are to be interpreted accordingly.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Notably, modifications and other embodiments of the disclosed disclosure(s) will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

We claim:

1. An apparatus, at a first node, the apparatus comprising:
   a receiver, which, in operation, receives a first channel;
   a transmitter, which, in operation, transmits a second channel arranged adjacent to the first channel along a time axis direction;
   a circuitry, which, in operation, determines at least part of at least one of the first channel or the second channel to be shortened lengthwise along the time axis direction, according to characteristic of the at least one of the first channel or the second channel, and, in response to said determining, shortens the at least part of the at least one of the first channel or the second channel,
   wherein,
   the characteristics of the first channel and the second channel include a first number of symbols to which the first channel is assigned and a second number of symbols to which the second channel is assigned,
   a first priority based on the first number of symbols is assigned to the first channel and a second priority based on the second number of symbols is assigned to the second channel, and
   the circuitry, in operation:
   in a case that one of the first channel and the second channel is assigned with a lower priority than another of the first channel and the second channel, determines a part of said one of the first channel and the second channel to be shortened and determines a part of said another of the first channel and the second channel not to be shortened; or
   in a case that one of the first channel and the second channel is assigned with a lower priority than another of the first channel and the second channel, determines a longer part of said one of the first channel and second channel to be shortened and determines a shorter part of said another of the first channel and the second channel to be shortened.

2. The apparatus according to claim 1, wherein the characteristics of the first channel and the second channel include types of the first channel and the second channel.

3. The apparatus according to claim 2, wherein the types of the first channel and the second channel include at least one of a Random Access Channel (RACH), a channel including Reference Signal (RS), a control channel, or a physical shared channel (PSCH).

4. The apparatus according to claim 3, wherein a priority of the PSCH is lower than a priority of the control channel, the priority of the control channel is lower than a priority of the channel including RS at a possible collision part, and the priority of the channel including RS at a possible collision part is lower than a priority of the RACH.

5. The apparatus according to claim 1, wherein the characteristics of the first channel and the second channel include Transmission Time Interval (TTI) lengths of the first channel and the second channel.

6. The apparatus according to claim 5, wherein one of the first channel and the second channel which has a longer TTI length is assigned with a lower priority than another of the first channel and the second channel which has a shorter TTI length.

7. The apparatus according to claim 1, wherein the characteristics of the first channel and the second channel include coding rates of the first channel and the second channel.

8. The apparatus according to claim 7, wherein one of the first channel and the second channel which has a lower coding rate is assigned with a lower priority than another of the first channel and the second channel which has a higher coding rate.

9. The apparatus according to claim 1, wherein the characteristics of the first channel and the second channel include a combination of at least two of types of the first channel and the second channel, Transmission Time Interval (TTI) lengths of the first channel and the second channel, and coding rates of the first channel and the second channel.

10. The apparatus according to claim 9, wherein the circuitry, in operation:
   determines at least part of at least one of the first channel or the second channel to be shortened, according to the types of the first channel and the second channel;
   in a case that the types of the first channel and the second channel are the same, determines at least part of at least one of the first channel or the second channel to be shortened, according to the TTI lengths of the first channel and the second channel; and
   in a case that the TTI lengths of the first channel and the second channel are the same, determines at least part of at least one of the first channel or the second channel to be shortened, according to the coding rates of the first channel and the second channel.

11. The apparatus according to claim 1, wherein the circuitry, in operation:
   determines an end part of the second channel to be shortened.

12. The apparatus according to claim 11, wherein a timing for starting to transmit the second channel is based on a timing for completing receiving of the first channel.

13. The apparatus according to claim 12, wherein the timing for starting to transmit the second channel is at the timing for completing receiving of the first channel, or a time interval between the timing for starting to transmit the second channel and the timing for completing receiving of the first channel is shorter than a threshold.

14. The apparatus according to claim 1, wherein circuitry, in operation, performs at least one of:
   determining an end part of the first channel not to be shortened, in a case that there is no next data to be transmitted from the first node; or
   determining an end part of the second channel not to be shortened, in a case that the first node is notified that there is no next data to be received at the first node.

15. The apparatus according to claim 1, wherein the receiver, in operation, receives the first channel from a second node, and the transmitter, in operation, transmits the second channel to a third node, and
   wherein the first node is one of a User Equipment (UE) or an Evolved Node B (eNB), the second node is one of a UE or an eNB, and the third node is one of a UE or an eNB.

16. The apparatus according to claim 1, wherein the first channel is one of a downlink channel, an uplink channel, or a sidelink channel; and the second channel is one of a downlink channel, an uplink channel, or a sidelink channel.

17. The apparatus according to claim 1, wherein the circuitry, in operation, performs one of:
   in response to said determining, puncturing the at least part of the at least one of the first channel and the second channel; or
   in response to said determining, rate matching the at least part of the at least one of the first channel and the second channel.

18. A system, at a first node configured to receive a first channel and/or transmit a second channel arranged adjacent to the first channel along a time axis direction, comprising:
   a processor;
   a memory storing computer executable instructions, when run by the processor, to perform steps of:
      determining at least part of at least one of the first channel and or the second channel to be shortened lengthwise along the time axis direction, according to characteristic of the at least one of the first channel or the second channel; and
      in response to said determining, shortening the at least part of the at least one of the first channel or the second channel,
   wherein,
   the characteristics of the first channel and the second channel include a first number of symbols to which the first channel is assigned and a second number of symbols to which the second channel is assigned,
   a first priority based on the first number of symbols is assigned to the first channel and a second priority based on the second number of symbols is assigned to the second channel, and
   said determining includes:
      in a case that one of the first channel and the second channel is assigned with a lower priority than another of the first channel and the second channel, determining a part of said one of the first channel and the second channel to be shortened and determining a part of said another of the first channel and the second channel not to be shortened; or
      in a case that one of the first channel and the second channel is assigned with a lower priority than another of the first channel and the second channel, determining a longer part of said one of the first channel and second channel to be shortened and determining a shorter part of said another of the first channel and the second channel to be shortened.

19. A wireless communication method, at a first node configured to receive a first channel and/or transmit a second channel arranged adjacent to the first channel along a time axis direction, the method comprising steps of:
   determining at least part of at least one of the first channel or the second channel to be shortened lengthwise along the time axis direction, according to characteristic of the at least one of the first channel and the second channel; and
   in response to said determining, shortening the at least part of the at least one of the first channel or the second channel,
   wherein,
   the characteristics of the first channel and the second channel include a first number of symbols to which the first channel is assigned and a second number of symbols to which the second channel is assigned,
   a first priority based on the first number of symbols is assigned to the first channel and a second priority based on the second number of symbols is assigned to the second channel, and
   said determining includes:
      in a case that one of the first channel and the second channel is assigned with a lower priority than another of the first channel and the second channel, determining a part of said one of the first channel and the second channel to be shortened and determining a part of said another of the first channel and the second channel not to be shortened; or in a case that one of the first channel and the second channel is assigned with a lower priority than another of the first channel and the second channel, determining a longer part of said one of the first channel and second channel to be shortened and determining a shorter part of said another of the first channel and the second channel to be shortened.

* * * * *